US012595626B2

(12) United States Patent
Kogure et al.

(10) Patent No.: US 12,595,626 B2
(45) Date of Patent: Apr. 7, 2026

(54) AQUEOUS BIODEGRADABLE-RESIN DISPERSION, PRODUCTION METHOD THEREFOR, AND FOOD-PACKAGING PAPER OBTAINED USING AQUEOUS BIODEGRADABLE-RESIN DISPERSION

(71) Applicant: MIYOSHI OIL & FAT CO., LTD., Tokyo (JP)

(72) Inventors: Yuma Kogure, Iwakura (JP); Sho Suzuki, Iwakura (JP)

(73) Assignee: MIYOSHI OIL & FAT CO., LTD., Tokyo (JP)

( * ) Notice: Subject to any disclaimer, the term of this patent is extended or adjusted under 35 U.S.C. 154(b) by 493 days.

(21) Appl. No.: 18/030,221

(22) PCT Filed: Aug. 31, 2021

(86) PCT No.: PCT/JP2021/031874
§ 371 (c)(1),
(2) Date: Apr. 4, 2023

(87) PCT Pub. No.: WO2022/074962
PCT Pub. Date: Apr. 14, 2022

(65) Prior Publication Data
US 2023/0349104 A1 Nov. 2, 2023

(30) Foreign Application Priority Data
Oct. 5, 2020 (JP) ................................. 2020-168546

(51) Int. Cl.
| | |
|---|---|
| *D21H 21/16* | (2006.01) |
| *B65D 65/46* | (2006.01) |
| *C09D 5/00* | (2006.01) |
| *C09D 7/20* | (2018.01) |
| *C09D 7/45* | (2018.01) |
| *C09D 7/63* | (2018.01) |
| *C09D 7/65* | (2018.01) |
| *C09D 167/02* | (2006.01) |
| *C09D 167/04* | (2006.01) |
| *D21H 19/12* | (2006.01) |
| *D21H 27/10* | (2006.01) |

(52) U.S. Cl.
CPC .......... *D21H 21/16* (2013.01); *B65D 65/466* (2013.01); *C09D 5/00* (2013.01); *C09D 7/20* (2018.01); *C09D 7/45* (2018.01); *C09D 7/63* (2018.01); *C09D 7/65* (2018.01); *C09D 167/02* (2013.01); *C09D 167/04* (2013.01); *D21H 19/12* (2013.01); *D21H 27/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,175,255 | A * | 12/1992 | Thomason | C07K 14/49 435/69.7 |
| 5,183,746 | A * | 2/1993 | Shaked | A61K 9/0019 435/69.51 |
| 5,980,947 | A * | 11/1999 | Yamakawa | A61K 9/1694 424/490 |
| 10,113,029 | B2 * | 10/2018 | Niizeki | A61K 8/85 |
| 2017/0327637 | A1 * | 11/2017 | Niizeki | C08F 22/02 |
| 2017/0367964 | A1 | 12/2017 | Yamamoto et al. | |
| 2022/0153996 | A1 | 5/2022 | Motomura et al. | |

FOREIGN PATENT DOCUMENTS

| | | | | |
|---|---|---|---|---|
| EP | 3 222 667 A1 | 9/2017 | | |
| JP | 4-46115 A | 2/1992 | | |
| JP | 4-46116 A | 2/1992 | | |
| JP | 6-65063 A | 3/1994 | | |
| JP | 10-101911 A | 4/1998 | | |
| JP | 2002-121288 A | 4/2002 | | |
| JP | 2004-35811 A | 2/2004 | | |
| JP | 2004-168927 A | 6/2004 | | |
| JP | 2004-331847 A | 11/2004 | | |
| JP | 2004323640 A | * 11/2004 | ............... | C08J 3/07 |
| JP | 2006-241400 A | 9/2006 | | |
| JP | 2008-50514 A | 3/2008 | | |
| JP | 2010-90239 A | 4/2010 | | |
| JP | 2011-153262 A | 8/2011 | | |
| JP | 2014-188944 A | 10/2014 | | |
| JP | 2018-53165 A | 4/2018 | | |
| JP | WO2020/189485 A1 | 9/2020 | | |

(Continued)

OTHER PUBLICATIONS

PH of Soap Solutions, Nature, Sep. 2, 1961, Eagland et al., pp. 1003-1004. (Year: 1961).*

(Continued)

*Primary Examiner* — Peter A Salamon
(74) *Attorney, Agent, or Firm* — Birch, Stewart, Kolasch & Birch, LLP

(57) ABSTRACT

Provided are: an aqueous biodegradable-resin dispersion in which the biodegradable resin has stable dispersibility and retains intact biodegradability and which can improve the heat sealability of paper products, etc.; and a method for producing the aqueous biodegradable-resin dispersion. The aqueous biodegradable-resin dispersion according to the present invention contains a biodegradable resin and an anionic compound, a 1 wt. % aqueous solution of the anionic compound having a pH of 7 or greater.

12 Claims, No Drawings

(56)                          References Cited

FOREIGN PATENT DOCUMENTS

WO      WO 2016/080530 A1      5/2016

OTHER PUBLICATIONS

Sodium Methyl Benzene Sulfonate, Google Search, Sep. 27, 2025, 1 page. (Year: 2025).*
Extended European Search Report for European Application No. 21877265.5, dated Aug. 2, 2024.
International Search Report (PCT/ISA/210) issued in PCT/JP2021/031874, dated Oct. 26, 2021.
Written Opinion of the International Searching Authority (PCT/ISA/237) issued in PCT/JP2021/031874, dated Oct. 26, 2021.
Chinese Office Action for corresponding Chinese Application No. 202180068290.1, dated Nov. 29, 2023, with English translation.

* cited by examiner

AQUEOUS BIODEGRADABLE-RESIN DISPERSION, PRODUCTION METHOD THEREFOR, AND FOOD-PACKAGING PAPER OBTAINED USING AQUEOUS BIODEGRADABLE-RESIN DISPERSION

TECHNICAL FIELD

The present invention relates to an aqueous biodegradable-resin dispersion, a production method therefor, and a food-packaging paper obtained using the aqueous biodegradable-resin dispersion.

BACKGROUND ART

Conventionally, food-packaging papers having oil resistance and heat-sealing properties have been known. Such conventional food-packaging papers specifically employ, for example, papers that are laminated with polypropylene (PP) or polyethylene (PE) to impart oil resistance and/or heat-sealing property.

Meanwhile, increasing awareness of the environment or marine plastic waste problem in recent years is leading to a growing demand for a material that could be an alternative to plastic. Such an alternative is particularly required for the purpose of food packaging where plastics are more frequently used, and in the field of food-packaging papers, materials that are biodegradable and may serve as substitutes for the PP or PE are now in development.

For example, as such biodegradable materials, aqueous biodegradable-resin dispersions are proposed (see, for example, patent documents 1 to 5). These aqueous biodegradable-resin dispersions employ, as dispersants, anionic compounds that are superior in respect of electrostatic interaction.

PRIOR ART DOCUMENTS

Patent Documents

Patent Document 1: JP-A-H10-101911
Patent Document 2: JP-A-2004-035811
Patent Document 3: JP-A-2004-168927
Patent Document 4: JP-A-2004-323640
Patent Document 5: WO2016/080530

SUMMARY OF THE INVENTION

Problems to be Solved by the Invention

Unfortunately, such aqueous biodegradable-resin dispersion is problematic in that the resultant biodegradable resin tends to have poor dispersibility unless a proper range of pH is used for the anionic compounds, and that a sufficient heat-sealing property cannot be ensured when it is applied to a paper product because particle sizes of the biodegradable resins cannot be small enough. Further, since no prior aqueous biodegradable-resin dispersions, including those of patent documents 1 to 5, have ever focused on a pH range of the anionic compounds, anionic compounds with improper pH ranges have been employed, which therefore makes it difficult to achieve a stable dispersion; that is, there has been a room for improvement in heat sealing property.

Moreover, in order to use aqueous biodegradable-resin dispersions for food packaging, they are required to meet the standards for foods, food additives, etc. under the food sanitation act, or they need to be licensed products that are recorded in the approved list of Food and Drug Administration (FDA). Therefore, when developing new aqueous biodegradable-resin dispersions for food packaging, it is also necessary to consider the limitations of the materials that can be used.

The present invention has been made in view of the above circumstances, and it is an object of the present invention to provide an aqueous biodegradable-resin dispersion that has a stable dispersibility and is able to improve the heat-sealing property of paper products, etc. without deteriorating the biodegradability; and a production method thereof. It is also an object of the present invention to provide a food packaging paper that is biodegradable and excellent in a heat-sealing property.

Means to Solve the Problems

To solve the above-mentioned objects, the aqueous biodegradable-resin dispersion of the present invention is an aqueous biodegradable-resin dispersion containing a biodegradable resin and an anionic compound, wherein the anionic compound exhibits a pH of 7 or greater in a 1 wt. % aqueous solution. The anionic compound of the aqueous biodegradable-resin dispersion is preferably at least one selected from a fatty acid salt whose constituent fatty acid has 12 to 16 carbon atoms; sodium tetradecene sulfonate; sodium polyphosphate; carboxymethylcellulose sodium; sodium alkylbenzene sulfonate; and sodium polyacrylate. The anionic compound of the aqueous biodegradable-resin dispersion is preferably at least one selected from a fatty acid salt whose constituent fatty acid has 12 to 16 carbon atoms; sodium tetradecene sulfonate; sodium polyphosphate; carboxymethylcellulose sodium; and sodium polyacrylate. The anionic compound of the aqueous biodegradable-resin dispersion is preferably at least one selected from a fatty acid salt whose constituent fatty acid has 12 to 16 carbon atoms; sodium tetradecene sulfonate; and sodium polyacrylate. The anionic compound of the aqueous biodegradable-resin dispersion is preferably at least one selected from a fatty acid salt whose constituent fatty acid has 12 to 16 carbon atoms; and sodium polyacrylate. The weight-average molecular weight of the anionic compound of the aqueous biodegradable-resin dispersion is preferably in a range of 10,000 to 20,000,000. It is preferred that the aqueous biodegradable-resin dispersion contain, as a dispersion stabilizer, polyvinyl alcohol having a saponification degree of 70 to 90%, and at least one selected, as a viscosity modifier, from guar gum, gum arabic, and xanthan gum, wherein a mass ratio (A/B) as a ratio of (A) the anionic compound to (B) the polyvinyl alcohol is in a range of 1/2 to 1/99, and the additive amount of the viscosity modifier is between 0.05% and 1.0% by weight of the biodegradable resin. The biodegradable resin of the aqueous biodegradable-resin dispersion is preferably of polylactate.

The present invention is characterized in that the food packaging paper employs the above-mentioned aqueous biodegradable-resin dispersion.

The method for producing the aqueous biodegradable-resin dispersion according to the present invention is a method for producing an aqueous biodegradable-resin dispersion containing a biodegradable resin and an anionic compound, wherein said method comprises a dispersing step of dispersing, into a solvent, at least the biodegradable resin and the anionic compound that are dissolved therein to obtain a dispersed liquid, and wherein 1 wt. % aqueous solution of the anionic compound has a pH of 7 or greater, and the dispersed liquid of the dispersing step has a pH of 4 to 9.

The aqueous biodegradable-resin dispersion according to the present invention can be obtained by the above-mentioned production method.

Effects of the Invention

The aqueous biodegradable-resin dispersion according to the present invention has a stable dispersibility, retains intact biodegradability, and enables paper products, etc. to have an improved heat sealability. The method for producing the aqueous biodegradable-resin dispersion according to the present invention assures the aqueous biodegradable-resin dispersion to be reliably obtained. The food-packaging paper according to the present invention is biodegradable and excellent in heat sealability.

MODE FOR CARRYING OUT THE INVENTION

Embodiments of an aqueous biodegradable-resin dispersion, a production method therefor, and a food-packaging paper obtained according to the present invention are respectively described hereunder.

The aqueous biodegradable-resin dispersion (hereunder referred to as "aqueous dispersion" in some cases) of the present invention contains a biodegradable resin and an anionic compound (dispersant).

The method for producing the aqueous biodegradable-resin dispersion according to the present invention involves a dispersing step of dispersing at least the biodegradable resin and the anionic compound that are dissolved in a solvent to obtain a dispersion liquid.

Such biodegradable resins are not particularly limited, and examples of which may include those of: polylactide; a copolymer of polylactide and other hydroxycarboxylic acid; diacid polyesters such as polybutylene succinate, polybutylene succinate adipate, polyethylene succinate and polybutylene adipate; polycaprolactone; a copolymer of caprolactone and other hydroxycarboxylic acid; polyhydroxybutyrate; a copolymer of polyhydroxybutyrate and other hydroxycarboxylic acid; polyhydroxybutyric acid; and a copolymer of polyhydroxybutyric acid and other hydroxycarboxylic acid. Any one kind of them may be used alone, or two or more kinds of them may be used in combination. Among them, it is preferred in respect of, e.g., heat resistance, water resistance, solvent resistance and glossiness of the resin that the biodegradable resins be of polylactide; a copolymer of polylactide and other hydroxycarboxylic acid; polybutylene succinate, polybutylene succinate adipate; or polycaprolactone, among which polylactide is more preferred.

In the case of polylactide, it is preferred that it has a D-lactic acid content of 1 to 30 mol %, more preferably of 5 to 20 mol %.

Further, the biodegradable resin has a number average molecular weight in a range of preferably 5,000 to 1,000,000, more preferably 10,000 to 300,000.

In the case of a copolymer of polylactide and other hydroxycarboxylic acid, Examples of the other hydroxycarboxylic acid include: glycolic acid, 2-hydroxybutyric acid, 2-hydroxyvaleric acid, 2-hydroxycaproic acid, 2-hydroxyheptanoic acid, 2-hydroxyoctanoic acid, 2-hydroxy-2-methylpropionic acid, 2-hydroxy-2-methylbutyric acid, 2-hydroxy-2-ethylbutyric acid, 2-hydroxy-2-methylvaleric acid, 2-hydroxy-2-ethylvalerate, 2-hydroxy-2-propylvalerate, 2-hydroxy-2 butylvalerate, 2-hydroxy-2-methylcaproic acid, 2-hydroxy-2-ethylcaproic acid, 2-hydroxy-2-propyl-caproic acid, 2-hydroxy-2-butylcaproic acid, 2-hydroxy-2-pentylcaproic acid, 2-hydroxy-2-methylheptanoic acid, 2-hydroxy-2-ethylheptanoic acid, 2-hydroxy-2-propylheptanoic acid, 2-hydroxy-2 butylheptanoic acid, 2-hydroxy-2-methyloctanoic acid, 3-hydroxypropionic acid, 4-hydroxybutyric acid, 5-hydroxyvaleric acid, 6-hydroxycaproic acid, and 7-hydroxyheptanoic acid.

The lactic acid or hydroxycarboxylic acid may be of any type such as D-, L- or -D/L isomer, which is not particularly limited.

The anionic compound exhibits a pH of 7 or greater in a 1 wt. % aqueous solution of the anionic compound. Specifically, the anionic compound in 1 wt. % aqueous solution of the anionic compound exhibits a pH preferably in a range of 7 to 11, more preferably 8 to 10, and even more preferably 9 to 10. When an anionic compound that falls in any of these ranges is selected, the pH value of the dispersion liquid in the dispersing step can be suitably controlled to thereby facilitate its zeta potential to have a proper value, and as a result of which the dispersion stability can be further improved. This enables paper products, etc. obtained using the aqueous biodegradable-resin dispersion liquid to have improved water resistance and heat sealability. Meanwhile, when the anionic compound in 1 wt. % aqueous solution of the anionic compound exhibits a pH of less than 7, the zeta potential deviates from the proper range value, which therefore weakens the respective interparticle repulsive forces and causes the particles to aggregate themselves, which in turn leads to a decreased stability of the dispersion liquid.

The anionic compounds are not particularly limited, and examples of which may include a fatty acid salt whose constituent fatty acid has 12 to 16 carbon atoms; sodium tetradecene sulfonate; sodium polyphosphate; carboxymethylcellulose sodium; sodium alkylbenzene sulfonate; and sodium polyacrylate. Among them, it is preferred in respect of excellent dispersion stability that the compound be sodium tetradecene sulfonate; sodium polyphosphate; carboxymethylcellulose sodium; sodium alkylbenzene sulfonate; and sodium polyacrylate, among which sodium polyacrylate is more preferred. In respect of improving water resistance and heat sealability of, for example, paper products obtained using the aqueous biodegradable-resin dispersion liquid, it is preferred that the anionic compound be at least one selected from a fatty acid salt whose constituent fatty acid has 12 to 16 carbon atoms; sodium tetradecene sulfonate; sodium polyphosphate; carboxymethylcellulose sodium; and sodium polyacrylate, among which more preferred are at least one selected from a fatty acid salt whose constituent fatty acid has 12 to 16 carbon atoms; sodium tetradecene sulfonate; and sodium polyacrylate, among which even more preferred are at least one selected from a fatty acid salt whose constituent fatty acid has 12 to 16 carbon atoms; and sodium polyacrylate.

The anionic compound may have a weight-average molecular weight in a range of, for example, 100 to 25,000,000, but in respect of dispersion stability and viscosity depressing property, it is preferred that the range be 10,000 to 20,000,000, more preferably 100,000 to 10,000,000. The weight-average molecular weight may be determined based on, for example, Gel permeation chromatography (GPC) with reference to a standard material having a known molar weight.

The content of the anionic compound is preferably in a range of 0.01 to 5.0 wt. % per the content of the biodegradable resin. The content is more preferably 0.01 to 2.0% by weight, even more preferably 0.01 to 1.0% by weight, particularly preferably 0.01 to 0.8% by weight. A content of 0.01% or more by weight further improves the effects of, e.g., dispersion stability while a content of 5.0% or less by weight facilitates stable viscosity control of the aqueous dispersion while improving the water resistance and heat sealability of, e.g., paper products obtained using the aqueous biodegradable-resin dispersion liquid.

As necessary, a surfactant, a plasticizer and/or a viscosity-controlling agent etc. aside from the above-mentioned anionic compounds may be added to the aqueous biodegradable-resin dispersion.

Examples of the surfactant, aside from the above-mentioned anionic compounds, include an anionic surfactant, a cationic surfactant, a non-ionic surfactant, an ampholytic surfactant and/or a polymer surfactant.

Although not particularly limited, examples of the anionic surfactant include a fatty acid salt, an ester salt of higher alcohol sulfate, a sulfuric acid ester salt of fluid fatty oil, a sulfuric acid salt of aliphatic amine and aliphatic amide, a phosphoric acid ester salt of aliphatic alcohol, an alkyl benzene sulfonate, a sulfonic acid salt of aliphatic amide, and a sulfonic acid salt of dibasic fatty acid ester.

Examples of the cationic surfactant include, for example, alkylamine salts, a quaternary ammonium salt, an alkylpyridinium salt, a fatty-acid triethanolamine monoester salt and an alkyl polyoxyethylene amine.

Examples of the non-ionic surfactant include a polyoxyethylene alkyl ether, a polyoxyethylene alkyl phenol ether, a polyoxyethylene alkyl ester, a sorbitan alkyl ester, and a polyoxyethylene sorbitan alkyl ester.

Examples of the polymer surfactant include an anionic polymer, a cationic polymer, a non-ionic polymer, and an ampholytic polymer. These polymer surfactants may be soluble in water, and examples of which include: a polyacrylate, polymethacrylate, polyacrylamide, acrylic acid/ alkyl methacrylate copolymer, acrylate/acrylamide copolymer, methacrylate/acrylamide copolymer, diisobutylene/ maleic acid copolymer, alkyl vinyl ether/maleic acid copolymermaleic polybutene, maleic polybutadiene, polymethyl vinyl ether, polyvinyl pyrrolidone, polystyrene sulfonate, cationic cellulose, carboxymethylcellulose, alginate, and polyvinyl alcohol. Among these, non-ionic surfactants are preferred in respect of safety and supply.

The aqueous biodegradable-resin dispersion preferably contains, as a dispersion stabilizer, polyvinyl alcohol which is a non-ionic surfactant. It is preferred that the polyvinyl alcohol have a saponification degree of 70 to 90% and a number average molecular weight of 50,000 to 300,000. The saponification degree of the polyvinyl alcohol can be calculated from the hydroxyl value of the polyvinyl alcohol. Adding the polyvinyl alcohol enables the biodegradable resin particles to be stably dispersed in the solvent.

The mass ratio (A/B) as a ratio of (A) the anionic compound (dispersant) to (B) the polyvinyl alcohol (dispersion stabilizer) is preferably in a range of 1/2 to 1/99. It is more preferred that the ratio be in a range of 1/5 to 1/99, even more preferably in a range of 1/10 to 1/99. A mass ratio (A/B) within the above-mentioned ranges facilitates dispersion and, improves stability thereof after dispersion, thus enabling paper products, etc., obtained using the aqueous biodegradable-resin dispersion liquid, to have an improved water resistance and heat-sealability.

It is preferred that the total weight of the (A) anionic compound (dispersant) and the (B) polyvinyl alcohol (dispersion stabilizer) be in a range of 0.1 to 20 wt. % per the weight of the biodegradable resin. The weight is more preferably in a range of 0.5 to 20% by weight, even more preferably in a range of 1 to 20% by weight. When the total weight of the (A) anionic compound (dispersant) and the (B) polyvinyl alcohol (dispersion stabilizer) is 0.1 wt. % or more, uniform stirring/dispersion are facilitated, whereas a weight of 20 wt. % or less can reduce inefficiency, caused by an excessively added dispersant, whilst minimizing an impact to the water resistance.

Further, it is also preferred that the total weight of the (A) anionic compound (dispersant), the (B) polyvinyl alcohol (dispersion stabilizer) and the biodegradable resin per weight of water be in a range of 2/8 to 6/4. It is efficient when the ratio is 2/8 or more, because the ratio leads to a higher content of biodegradable resin, whilst a ratio of 6/4 or less facilitates uniform stirring/dispersion, which in turn improves the stability of the aqueous dispersion. This enables paper products, etc. obtained using the aqueous biodegradable-resin dispersion liquid to have improved water resistance and heat sealability.

Examples of the plasticizer includes: citrate derivatives such as triethyl citrate, tributyl citrate, acetyl triethyl citrate and acetyl tributyl citrate; ether ester derivatives such as diethylene glycol diacetate, triethylene glycol diacetate and triethylene glycol dipropionate; glycerin derivatives such as glycerin triacetate, glycerin tripropionate and glycerin tributyrate; phthalate derivatives such as ethyl phthalyl ethyl glycolate, ethyl phthalyl butyl glycolate and butyl phthalyl butyl glycolate; adipic acid derivatives such as mixed esters of adipic acid with 2-(2-methoxyethoxy)ethanol or benzyl alcohol and condensed products of adipic acid and 1,4-butanediol; and polyhydroxy carboxylic acids such as polycaprolactone and polypropiolactone. Among these examples, those employing adipic acid derivatives or phthalate derivatives are particularly preferable in respect of achieving a high effect of improving film-forming property. The additive amount of the plasticizer is preferably 5 to 40 parts by weight based on 100 parts by weight of the biodegradable resin. An amount of 5 parts by weight or less is more advantageous for effecting plasticization whereas an amount of 40 parts by weight or less can inhibit a bleed out of the plasticizer from occurring.

Examples of the viscosity controlling agent include cellulose derivatives such as methylcellulose, carboxymethyl cellulose, hydroxyethyl cellulose, hydroxyethyl methylcellulose and hydroxypropyl methylcellulose, starch derivatives such as cationized starch and etherified starch, plant gums such as gum arabic, guar gum and xanthane gum, animal polymers such as casein, chitosan and chitin, of which guar gum, gum arabic and xanthane gum are preferable. It is preferred that the additive amount of the viscosity controlling agent be in a range of 0.05 to 1.0% by weight of the biodegradable resin. An amount of 0.05% or more by weight improves viscosity controlling effect while an amount of 1.0% or less by weight facilitates stable viscosity control of the aqueous dispersion. In one of the preferable embodiments, the aqueous biodegradable-resin dispersion contains, as a dispersion stabilizer, polyvinyl alcohol having a saponification degree of 70 to 90% and at least one selected from guar gum, gum arabic and xanthane gum which serve as viscosity controlling agents, wherein a mass ratio (A/B) as a ratio of (A) the anionic compound to (B) the polyvinyl alcohol is in a range of 1/2 to 1/99, and an additive amount of the viscosity controlling agent is in a range of 0.05 to 1.0% by weight of the biodegradable resin. Preferable examples of the polyvinyl alcohol (B) are as explained above.

It is preferred that the aqueous biodegradable-resin dispersion have a viscosity in a range of 0.1 to 10 Pa·s; that is, it is preferable that the viscosity is 0.1 Pa·s or more and 10 Pa·s or less. For example, an aqueous biodegradable-resin dispersion having a viscosity of less than 0.1 Pa·s may lead to difficulty in keeping it in a favorable dispersing condition, due to, e.g., a phase separation, non-uniformity or sedimentation of the resin particles, which may necessitate strong agitation by means of, for example, a dispersing device such as homo mixers or high-pressure emulsifiers. This strong agitation applies a strong shearing force and causes dispersant molecules, having been adsorbed on the dispersing particles, to be exfoliated, which therefore poses a risk of increasing the breadth of the particle distribution or making dispersion difficult in the first place. Meanwhile, an aqueous biodegradable-resin dispersion having a viscosity of more than 10 Pa·s leads to an excessively high viscosity of the solution, which therefore may prevent a favorable dispersion.

Moreover, the aqueous biodegradable-resin dispersion according to the present invention may contain waxes such as natural or synthetic waxes for improving, for example, surface smoothness, water repellency, and/or mold releasability. Examples of the natural waxes include plant-based natural waxes such as candelilla wax, carnauba wax, rice wax, wood wax and jojoba solid wax; animal-based natural waxes such as beeswax, lanolin and whale wax; mineral-based natural waxes such as montan wax, ozokerite and ceresin; petroleum-based natural waxes such as paraffin wax, microcrystalline wax and petrolatum wax. Furthermore, examples of the synthetic waxes include synthetic hydrocarbons such as Fischer-Tropsch wax and polyethylene wax; modified waxes such as montan wax derivatives, paraffin wax derivatives and microcrystalline wax derivatives; hydrogenated waxes such as hardened castor oil and hardened castor oil derivatives; 12-hydroxystearic acid; stearic acid amide; and anhydrous phthalic acid imide.

The biodegradable resin contained in the aqueous biodegradable-resin dispersion is in a particle form, and the average particle diameter of the particles is preferably in a range of 0.1 to 500 μm, more preferably in a range of 0.5 to 50 μm, even more preferably in a range of 0.5 to 10 μm.

Next, an embodiment of a method for producing the aqueous biodegradable-resin dispersion according to the present invention is explained.

The method for producing the aqueous biodegradable-resin dispersion according to the present invention involves a dispersing step of dispersing, into a solvent, at least the biodegradable resin and the anionic compound that are dissolved therein to obtain a dispersion liquid.

As already mentioned above, the anionic compound exhibits a pH of 7 or more in 1 wt. % aqueous solution.

The dispersing liquid of the dispersing step may be obtained by mixing and stirring a solvent, a biodegradable resin and an anionic compound together with, where necessary, some other materials.

In particular, firstly, there may be exemplified, for example, a pressurized dispersion method using a sealed tank having a stirrer in which a biodegradable resin, an anionic compound, polyvinyl alcohol, a viscosity controlling agent and water are put all at once, which are then pressurized whilst being stirred and heated to disperse the biodegradable resin.

Secondly, there may be exemplified a direct dispersion method in which a melt containing a biodegradable resin, an anionic compound and, where necessary, polyvinyl alcohol as well as a viscosity controlling-agent is added to hot water kept under pressure, which is stirred for the dispersion thereof.

Thirdly, there may be exemplified a phase inverting method of heating and melting a biodegradable resin to which an aqueous solution containing an anionic compound and, where necessary, polyvinyl alcohol as well as a viscosity controlling agent is added and is stirred to disperse the biodegradable resin into water.

Fourthly, there may be exemplified a method of adding an organic solvent, water, a biodegradable resin, an anionic compound and, where necessary, polyvinyl alcohol as well as a viscosity controlling agent and stirring the same for the dispersion thereof followed by eliminating the organic solvent.

Fifthly, there may be exemplified a method of adding, to an organic solvent solution of the biodegradable resin, an aqueous solution containing an anionic compound and, where necessary, polyvinyl alcohol as well as a viscosity controlling agent, and stirring the same for the dispersion thereof followed by eliminating the organic solvent.

Aside from the methods of the first to fifth methods, any other suitable method may be suitably employed as long as an aqueous dispersion of biodegradable resin can be achieved.

More specifically, in respect of, e.g., applicability to a wide variety of biodegradable resins, and in consideration of the progress of hydrolysis, it is preferred that the method for obtaining the dispersing liquid be a method where an organic solvent, water, a biodegradable resin, an anionic compound and, where necessary, polyvinyl alcohol as well as a viscosity controlling agent are put into a sealed tank, equipped with a stirrer, followed by raising the temperature while stirring them so as to dissolve and disperse the solid ingredients, and then performing cooling, whereafter the organic solvent is to be eliminated under reduced pressure.

Further, the method is preferably a method where an organic solvent and a biodegradable resin are put into a sealed tank equipped with a stirrer followed by raising the temperature while stirring them so as to dissolve the resin to obtain a dissolved biodegradable resin solution, while, into a further stirring tank, water, an anionic compound and, where necessary, polyvinyl alcohol as well as a viscosity controlling agent are put to obtain an aqueous solution with these ingredients dissolved therein, followed by adding the aqueous solution into the sealed tank while performing stirring and raising the temperature to a temperature not lower than the resin dissolution temperature to disperse them, whereafter cooling is conducted, the organic solvent is then eliminated under reduced pressure.

In these methods, examples of the organic solvent include ester-based organic solvents which are, for example, formic acid esters such as methyl formate, ethyl formate, propyl formate and butyl formate, and acetic acid esters such as methyl acetate, ethyl acetate, propyl acetate and butyl acetate; chlorine-based organic solvents such as chloroform and carbon tetrachloride; and aromatic hydrocarbons such as benzene, toluene and xylene. Of these examples, preferred are the ester-based organic solvents with a favorable resin solubility; particularly preferred are the formic acid esters and acetic acid esters.

In the method for producing the aqueous biodegradable-resin dispersion according to the present invention, the dispersion liquid of the dispersing step has a pH of 4 to 9, preferably of 4 to 6. A pH within this range may facilitate the zeta potential thereof to take a proper value which causes the polymer particles to be, for example, moderately repulsed with each other to thereby achieve an aqueous biodegradable-resin dispersion having stable dispersibility. Specifically, the aqueous biodegradable-resin dispersion has a zeta potential preferably of –30 mV or less, more preferably of –40 mV or less. Basically, a zeta potential of less than these values further improves temporal stability. Although no lower limit is particularly imposed for the zeta potential, it is typically 50 mV or more for a case of normal preparation. It is also preferred to eliminate the organic solvent after phase inversion emulsification to keep the amount of residual solvent at 1,000 ppm or less.

The biodegradable-resin dispersion according to the present invention has stable dispersibility, retains intact biodegradability, and enables paper products, etc. to have improved heat sealability when it is applied to, e.g., fiber or paper products, which therefore allows it to be utilized in a highly useful and practical manner for various proposes in industry.

The biodegradable resin according to the present invention may be used for an application which is not particularly limited but includes, for example, food packaging paper. The biodegradable resin according to the present invention may also be used for a spacer for liquid crystal display apparatuses, an additive for toners, a rheology modifier/additive for toners for developing electrophotographs and coatings, a material for powder coatings, a mechanical property improving agent for molded articles such as automobile materials and architectural materials, a mechanical property improving agent for films, papers, fibers and the like, a raw material for resin-formed articles of rapid prototyping and rapid manufacturing, a material for flush molding, a paste resin for plastic sols, a powder blocking material, a fluidity-smoothness improving agent for powder bodies, a lubricant, a rubber compounding agent, a polisher, a thickening agent, a filtration agent and a filtration aid, a gelling agent, a flocculating agent, an oil absorbing agent, a mold release agent, a slipperiness improving agent for plastic films and sheets, a blocking inhibitor, a gloss controlling agent, a matting agent, a light diffusing agent, a surface high hardness improving agent, a toughness improving agent, a filler for chromatography, an aid for microcapsules, medical materials such as a drug delivery system and a diagnostic drug, a medical diagnostic agent, a preserving agent for flavor materials and agrochemicals, a catalyst and a support thereof for chemical reactions, a gas adsorbing agent, an ion exchanged resin, a sintering material for ceramic processing, standard particles for measurement and analysis, particles for the field of food industry, and the like.

The biodegradable-resin aqueous dispersion, the production method therefor, and the food-packaging paper obtained using the aqueous biodegradable-resin dispersion according to the present invention shall not be limited to the embodiments as described above.

WORKING EXAMPLES

The aqueous biodegradable-resin dispersion or the like of the present invention is explained in detail hereunder with reference to working examples. However, the invention shall not be limited to the following working examples.

1. Preparation of Biodegradable Resin Dispersion

In the working and comparative examples, the materials as shown below were used for the biodegradable resin(s), the anionic compounds exhibiting pHs of 7 or more in 1 wt. % aqueous solution (Dispersant (A)) or the surfactants (Dispersant (A)) aside from the above-mentioned anionic compounds, the polyvinyl alcohol (dispersion stabilizer (B)) and the viscosity controlling agent.

[Biodegradable Resin]
Biodegradable resin A: Polylactate
Biodegradable resin B: Polybutylene succinate
Biodegradable resin C: Polybutylene succinate adipate
Biodegradable resin D: Polycaprolactone
[Anionic Compounds Exhibiting pHs of 7 or More in 1 wt. % Aqueous Solution]
Anionic compound A: Sodium polyacrylate (weight-average molecular weight of 500,000)
Anionic compound B: Sodium polyacrylate (weight-average molecular weight of 3,000,000 to 5,000,000)
Anionic compound C: Fatty acid sodium (C12, C14 or C16)
Anionic polymer compound D: Sodium tetradecene sulfonate
Anionic compound E: Sodium polyphosphate
Anionic compound F: Carboxymethylcellulose sodium
Anionic compound G: Sodium alkylbenzene sulfonate
[Surfactants (Anionic Compounds) Aside From the Above-Mentioned Anionic Compounds]
Anionic compound H: Polyacrylamide/sodium acrylate (weight-average molecular weight of 16,000,000 to 17,000,000)
Anionic compound I: Acrylamide/methacrylate copolymer (weight-average molecular weight of 20,000,000)
Anionic compound J: Methacrylate/acrylamide (weight-average molecular weight of 4,000,000)
Anionic compound K: Alginate sodium
[Polyvinyl Alcohol]
Polyvinyl alcohol A: Saponification degree of 80%, number average molecular weight of 100,000
Polyvinyl alcohol B: Saponification degree of 99%, number average molecular weight of 90,000
[Viscosity Controlling Agent]
Viscosity controlling agent A: Xanthane gum ("Echo Gum", manufactured by DSP Gokyo Food & Chemical)
Viscosity controlling agent B: Guar gum ("VIS-TOP D20" manufactured by San-Ei Gen F.F.I., Inc.)
Viscosity controlling agent C: Gum Arabic ("Arabic KORU SS" manufactured by SAN-EI YAKUHIN BOEKI CO., LTD.)

Working Examples 1 to 15 and Comparative Examples 1 to 4

At the compounding ratios shown in Tables 1 and 2, the components were put into a sealed dispersion tank, followed by raising the temperature to 65° C., in the case where the biodegradable resin A, C or D was used, or to 120° C. in the case where the biodegradable resin B was used to disperse the components by a dispersion method using a given stirring dispersion device, before rapidly lowering the temperature to 40° C. An aqueous biodegradable-resin dispersion was then obtained by eliminating the ethyl acetate under reduced pressure.

Furthermore, the viscosity and stability in the dispersion step during the preparation of the polyester resin aqueous dispersion (after the heating/dispersion and cooling during the stirring mixing), and the viscosity and stability of the aqueous dispersion (after the removal of ethyl acetate) were measured and evaluated as follows.

[pH]
The pH was measured at 25° C. using a glass electrode hydrogen densitometer "pH METER 9615S-10D" manufactured by HORIBA, Ltd.

[Zeta Potential (mV)]
Water was added to each aqueous biodegradable-resin dispersion to dilute the dispersion to a solid content of 1% by weight, followed by measuring a zeta potential of the dilution with a measurement device "Zetasizer Nano ZS" manufactured by Malvern Panalytical Ltd. The measurements were carried out at 25° C.

[Average Particle Diameter (μm)]

The average particle diameter of the particles was measured by using a laser diffraction type particle size distribution measurement apparatus (type SALD-2300 manufactured by Shimadzu Corporation, refractive index: 1.45-0.00i).

[Centrifugation]

Centrifugation was carried out for 20 minutes at 3,500 rpm using "tabletop centrifuge Model 4000" manufactured by KUBOTA corporation. The resultant samples were then evaluated at four levels of separation progresses: ⊚: less than 10% of them are separated, ○: from 0% to less than 30% of them are separated, Δ: from 30% to less than 50% of them are separated, and ×: 50% or more of them are separated.

[Stability Test: Left to Stand Still at 25° C.]

The respective aqueous biodegradable-resin dispersions were put into 100 ml glass containers and stored in a thermostat bath at 25° C. The separation progresses thereof were evaluated 14 days after the storage at four levels of: ⊚: less than 10% of them are separated, ○: more than 10% to less than 30% of them are separated, Δ: more than 30% to less than 50% of them are separated, and ×: 50% or more of them are separated.

[Stability Test: Left to Stand Still at 40° C.]

The respective aqueous biodegradable-resin dispersions were put into 100 ml glass containers and stored in a thermostat bath at 40° C. The separation progresses thereof were evaluated 14 days after the storage at four levels: ⊚: less than 10% separation of them are separated, ○: from 10% to less than 30% of them are separated, Δ: from 30% to less than 50% of them are separated, and ×: from 50% of them are separated.

[Heat Sealability: Exfoliation Strength (N/m)]

The aqueous dispersion prepared in each of the working examples 1 to 15 and comparative examples 1 to 4 was applied, using a bar coater No. 20, to a 25 mm×150 mm portion of a craft paper (basis weight of 70 g/m²) that was cut into a strip of 25 mm×200 mm, and then dried at 25° C. and 40% relative humidity for 24 hours followed by sandwiching two test strips between ferrotype plates so that the coated surfaces of the two test strips were in contact with each other, and then pressing them for three minutes at 180° C. under a condition of 300 g/cm² using a fully automatic transfer press HP-84 manufactured by HASHIMA CO., LTD to obtain the test strips. The resultant test strips were left to stand still for one day, and then the respective exfoliation strengths (N/m) were measured based on JIS K 6854-3 at a tensile speed of 10 mm/minute using a tensile testing machine "Strograph E3" manufactured by Toyo Seiki Seisaku-sho, Ltd.

[Water Resistance Test]

The aqueous dispersion prepared in each of the working examples 1 to 15 and comparative examples 1 to 4 was applied, using a bar coater No. 20, to a craft paper (basis weight of 70 g/m²) that was cut into a strip of 130 mm×130 mm, and then dried at 25° C. and 40% relative humidity for 24 hours followed pressing them for three minutes at 180° C. under a condition of 300 g/cm² using a fully automatic transfer press HP-84 manufactured by HASHIMA CO., LTD to obtain the test strips. Evaluation of the water resistance was based on JIS-P-8140 and determined by the amount of water absorption (g/m²) whose evaluation criteria are: ⊚: 0 to less than 5, ○: 5 to less than 10, Δ: 10 to less than 20, ×: 20 or more.

The results are as shown in Tables 1A to 1C and Tables 2 and 3.

TABLE 1A

| Item | | | pH (1% active amount solution) | Working Example 1 | 2 | 3 | 4 | 5 |
|---|---|---|---|---|---|---|---|---|
| | | Ingredient | | | | | | |
| Biodegradable resin | A | Polylactate | | 100 | 100 | 100 | 100 | 100 |
| | B | Polybutylene succinate | | | | | | |
| | C | Polybutylene succinate adipate | | | | | | |
| | D | Polycaprolactone | | | | | | |
| Dispersant (A) Anionic compound | A | Sodium polyacrylate (Mn ≈ 500,000) | 9.4 | | 0.2 | | | |
| | B | Sodium polyacrylate (Mn ≈ 3 mil. to 5 mil.) | 9.5 | 0.2 | | | | |
| | C | Fatty acid sodium (C12, C14, C16) | 10.6 | | | 0.2 | | |
| | D | Sodium tetradecene sulfonate | 9.3 | | | | 0.2 | |
| | E | Sodium polyphosphate | 7.7 | | | | | 0.2 |
| | F | Carboxymethylcellulose sodium | 7.0 | | | | | |
| | G | Sodium alkylbenzene sulfonate | 9.0 | | | | | |
| Dispersion stabilizer (B) | A | Polyvinyl alcohol, Saponification degree: 80%, Average MW = 100,000 | | 4.8 | 4.8 | 4.8 | 4.8 | 4.8 |
| | B | Polyvinyl alcohol, Saponification degree: 99%, Average MW = 90,000 | | | | | | |
| | | Dispersant (A)/Dispersion stabilizer (B) | | 1/24 | 1/24 | 1/24 | 1/24 | 1/24 |
| | | Content of anionic compound (wt. %) | | 0.20 | 0.20 | 0.20 | 0.20 | 0.20 |
| Viscosity controlling agent | A | Xanthane gum | | 0.5 | 0.5 | 0.5 | 0.5 | 0.5 |
| | B | Guar gum | | | | | | |
| | C | Gum Arabic | | | | | | |
| Solvent | | Ethyl acetate | | 230 | 230 | 230 | 230 | 230 |
| | | Water | | 160 | 160 | 160 | 160 | 160 |
| | | Aqueous dispersion active amount (%) | | 40 | 40 | 40 | 40 | 40 |
| Evaluation | pH | in dispersing step | | 4.8 | 4.8 | 5.1 | 4.7 | 4.2 |
| | | Aqueous dispersion | | 4.8 | 4.8 | 4.8 | 4.8 | 4.8 |
| | Zeta potential (mV) | in dispersing step | | −41 | −39 | −40 | −36 | −31 |
| | | Aqueous dispersion | | −41 | −39 | −40 | −36 | −32 |

TABLE 1A-continued

| | | pH (1% active amount | Working Example | | | | |
|---|---|---|---|---|---|---|---|
| Ingredient | | solution) | 1 | 2 | 3 | 4 | 5 |
| Average particle | in dispersing step | | 4.3 | 4.5 | 4.8 | 4.8 | 4.9 |
| diameter(μm) | Aqueous dispersion | | 4.3 | 4.5 | 4.7 | 4.7 | 4.8 |
| Standard | in dispersing step | | 0.1 | 0.1 | 0.1 | 0.1 | 0.1 |
| deviation | Aqueous dispersion | | 0.1 | 0.1 | 0.1 | 0.1 | 0.1 |
| Stability test | Left to stand still at 25° C. | | ◎ | ◎ | ○ | ○ | ○ |
| | Left to stand still at 40° C. | | ◎ | ○ | ○ | ○ | ○ |
| | Centrifugation (Upper layer concentration) | | ○ | ○ | ○ | ○ | ○ |
| | Heat sealability (N/m) | | 420 | 400 | 390 | 370 | 360 |

TABLE 1B

| Item | | | pH (1% active amount | Working Example | | | | |
|---|---|---|---|---|---|---|---|---|
| Ingredient | | | solution) | 6 | 7 | 8 | 9 | 10 |
| Biodegradable | A | Polylactate | | 100 | 100 | 100 | 100 | |
| resin | B | Polybutylene succinate | | | | | | 100 |
| | C | Polybutylene succinate adipate | | | | | | |
| | D | Polycaprolactone | | | | | | |
| Dispersant (A) | A | Sodium polyacrylate (Mn ≈ 500,000) | 9.4 | | | | | |
| Anionic | B | Sodium polyacrylate (Mn ≈ 3 mil. to 5 mil.) | 9.5 | | | 0.2 | 0.2 | 0.2 |
| compound | C | Fatty acid sodium (C12, C14, C16) | 10.6 | | | | | |
| | D | Sodium tetradecene sulfonate | 9.3 | | | | | |
| | E | Sodium polyphosphate | 7.7 | | | | | |
| | F | Carboxymethylcellulose sodium | 7.0 | 0.2 | | | | |
| | G | Sodium alkylbenzene sulfonate | 9.0 | | 0.2 | | | |
| Dispersion | A | Polyvinyl alcohol, Saponification degree: 80%, | | 4.8 | 4.8 | 4.8 | 4.8 | 4.8 |
| stabilizer (B) | | Average MW = 100,000 | | | | | | |
| | B | Polyvinyl alcohol, Saponification degree: 99%, | | | | | | |
| | | Average MW = 90,000 | | | | | | |
| | | Dispersant (A)/Dispersion stabilizer (B) | | 1/24 | 1/24 | 1/24 | 1/24 | 1/24 |
| | | Content of anionic compound (wt. %) | | 0.20 | 0.20 | 0.20 | 0.20 | 0.20 |
| Viscosity | A | Xanthane gum | | 0.5 | 0.5 | | | 0.5 |
| controlling | B | Guar gum | | | | 0.5 | | |
| agent | C | Gum Arabic | | | | | 0.5 | |
| Solvent | | Ethyl acetate | | 230 | 230 | 230 | 230 | 230 |
| | | Water | | 160 | 160 | 160 | 160 | 160 |
| | | Aqueous dispersion active amount (%) | | 40 | 40 | 40 | 40 | 40 |
| Evaluation | pH | in dispersing step | | 4.0 | 4.6 | 4.8 | 4.8 | 4.8 |
| | | Aqueous dispersion | | 4.8 | 4.8 | 4.8 | 4.8 | 4.8 |
| | Zeta potential | in dispersing step | | −30 | −35 | −39 | −38 | −34 |
| | (mV) | Aqueous dispersion | | −32 | −35 | −39 | −38 | −34 |
| | Average particle | in dispersing step | | 4.9 | 4.7 | 4.4 | 4.5 | 4.8 |
| | diameter(μm) | Aqueous dispersion | | 4.9 | 4.7 | 4.4 | 4.5 | 4.8 |
| | Standard | in dispersing step | | 0.1 | 0.1 | 0.1 | 0.1 | 0.1 |
| | deviation | Aqueous dispersion | | 0.1 | 0.1 | 0.1 | 0.1 | 0.1 |
| | | Left to stand still at 25° C. | | ○ | ○ | ◎ | ◎ | ○ |
| | Stability test | Left to stand still at 40° C. | | ○ | ○ | ○ | ○ | ○ |
| | | Centrifugation (Upper layer concentration) | | ○ | ○ | ○ | ○ | ○ |
| | | Heat sealability (N/m) | | 350 | 360 | 400 | 400 | 350 |

TABLE 1C

| | | Item | pH (1% active amount solution) | Working Example | | | | |
|---|---|---|---|---|---|---|---|---|
| | Ingredient | | | 11 | 12 | 13 | 14 | 15 |
| Biodegradable resin | A | Polylactate | | | | 100 | 100 | 100 |
| | B | Polybutylene succinate | | | | | | |
| | C | Polybutylene succinate adipate | | 100 | | | | |
| | D | Polycaprolactone | | | 100 | | | |
| Dispersant (A) Anionic compound | A | Sodium polyacrylate (Mn ≈ 500,000) | 9.4 | | | | | |
| | B | Sodium polyacrylate (Mn ≈ 3 mil. to 5 mil.) | 9.5 | 0.2 | 0.2 | 0.5 | 0.2 | 0.2 |
| | C | Fatty acid sodium (C12, C14, C16) | 10.6 | | | | | |
| | D | Sodium tetradecene sulfonate | 9.3 | | | | | |
| | E | Sodium polyphosphate | 7.7 | | | | | |
| | F | Carboxymethylcellulose sodium | 7.0 | | | | | |
| | G | Sodium alkylbenzene sulfonate | 9.0 | | | | | |
| Dispersion stabilizer (B) | A | Polyvinyl alcohol, Saponification degree: 80%, Average MW = 100,000 | | 4.8 | 4.8 | 4.8 | 10 | |
| | B | Polyvinyl alcohol, Saponification degree: 99%, Average MW = 90,000 | | | | | | 4.8 |
| | | Dispersant (A)/Dispersion stabilizer (B) | | 1/24 | 1/24 | 5/48 | 1/50 | 1/24 |
| | | Content of anionic compound (wt. %) | | 0.20 | 0.20 | 0.50 | 0.20 | 0.20 |
| Viscosity controlling agent | A | Xanthane gum | | 0.5 | 0.5 | 0.5 | 0.5 | 0.5 |
| | B | Guar gum | | | | | | |
| | C | Gum Arabic | | | | | | |
| Solvent | | Ethyl acetate | | 230 | 230 | 230 | 230 | 230 |
| | | Water | | 160 | 160 | 160 | 160 | 160 |
| | | Aqueous dispersion active amount (%) | | 40 | 40 | 40 | 40 | 40 |
| Evaluation | pH | in dispersing step | | 4.8 | 4.8 | 4.9 | 4.8 | 4.8 |
| | | Aqueous dispersion | | 4.8 | 4.8 | 4.8 | 4.8 | 4.8 |
| | Zeta potential (mV) | in dispersing step | | −33 | −33 | −42 | −41 | −40 |
| | | Aqueous dispersion | | −32 | −32 | −41 | −41 | −41 |
| | Average particle diameter(μm) | in dispersing step | | 4.8 | 4.8 | 4.2 | 2.6 | 4.3 |
| | | Aqueous dispersion | | 4.8 | 4.8 | 4.2 | 2.5 | 4.4 |
| | Standard deviation | in dispersing step | | 0.1 | 0.1 | 0.1 | 0.1 | 0.1 |
| | | Aqueous dispersion | | 0.1 | 0.1 | 0.1 | 0.1 | 0.1 |
| | Stability test | Left to stand still at 25° C. | | ○ | ○ | ◎ | ◎ | ◎ |
| | | Left to stand still at 40° C. | | ○ | ○ | ◎ | ◎ | ○ |
| | | Centrifugation (Upper layer concentration) | | ○ | ○ | ○ | ◎ | ○ |
| | | Heat sealability (N/m) | | 350 | 350 | 420 | 430 | 410 |

TABLE 2

| | | Item | pH(1% active amount solution) | Comparative Example | | | |
|---|---|---|---|---|---|---|---|
| | Ingredient | | | 1 | 2 | 3 | 4 |
| Biodegradable resin | A | Polylactate | | 100 | 100 | 100 | 100 |
| | B | Polybutylene succinate | | | | | |
| | C | Polybutylene succinate adipate | | | | | |
| | D | Polycaprolactone | | | | | |
| Dispersant (A) Anionic compound | H | Polyacrylamide/sodium acrylate (Mn ≈ 16,000,000 to 17,000,000) | 6.5 | 0.2 | | | |
| | I | Acrylamide/methacrylate copolymer (Mn ≈ 20,000,000) | 6.1 | | 0.2 | | |
| | J | Methacrylate/acrylamide (Mn ≈ 4,000,000) | 6.3 | | | 0.2 | |
| | K | Alginate sodium | 6.7 | | | | 0.2 |
| Dispersion stabilizer (B) | A | Polyvinyl alcohol, Saponification degree: 80%, Average MW = 100,000 | | 4.8 | 4.8 | 4.8 | 4.8 |
| | B | Polyvinyl alcohol, Saponification degree: 99%, Average MW = 90,000 | | | | | |
| | | Dispersant (A)/Dispersion stabilizer (B) | | 1/24 | 1/24 | 1/24 | 1/24 |
| Viscosity controlling agent | A | Xanthane gum | | 0.5 | 0.5 | 0.5 | 0.5 |
| | B | Guar gum | | | | | |
| | C | Gum Arabic | | | | | |
| Solvent | | Ethyl acetate | | 230 | 230 | 230 | 230 |
| | | Water | | 160 | 160 | 160 | 160 |
| | | Aqueous dispersion active amount (%) | | 40 | 40 | 40 | 40 |
| Evaluation | pH | in dispersing step | | 3.8 | 3.5 | 3.5 | 3.7 |

TABLE 2-continued

| | Item | pH(1% active amount solution) | Comparative Example | | | |
|---|---|---|---|---|---|---|
| Ingredient | | | 1 | 2 | 3 | 4 |
| | Aqueous dispersion | | 4.8 | 4.8 | 4.8 | 4.8 |
| Zeta potential | in dispersing step | | −25 | −20 | −21 | −24 |
| (mV) | Aqueous dispersion | | −38 | −36 | −36 | −37 |
| Average particle | in dispersing step | | 5.5 | 5.3 | 5.3 | 5.6 |
| diameter(μm) | Aqueous dispersion | | 5.3 | 5.3 | 5.3 | 5.5 |
| Standard | in dispersing step | | 0.1 | 0.1 | 0.1 | 0.1 |
| deviation | Aqueous dispersion | | 0.1 | 0.1 | 0.1 | 0.1 |
| Stability test | Left to stand still at 25° C. | | Δ | Δ | Δ | Δ |
| | Left to stand still at 40° C. | | Δ | Δ | Δ | Δ |
| | Centrifugation (Upper layer concentration) | | Δ | Δ | Δ | Δ |
| Heat sealability (N/m) | | | 340 | 330 | 330 | 330 |

TABLE 3

| | Working Example | | | | | | | |
|---|---|---|---|---|---|---|---|---|
| | 1 | 2 | 3 | 4 | 5 | 6 | 7 | 8 |
| Water resistance test | ◎ | ◎ | ○ | ○ | ○ | ○ | ○ | ◎ |

| | Working Example | | | | | | |
|---|---|---|---|---|---|---|---|
| | 9 | 10 | 11 | 12 | 13 | 14 | 15 |
| Water resistance test | ◎ | ○ | ○ | ○ | ◎ | ◎ | ◎ |

As shown in Tables 1A and 1B, excellent stability and heat sealability were observed in the working examples 1 to 15 where the aqueous biodegradable-resin dispersions contain anionic compounds, exhibiting a pH of 7 or more in 1 wt. % aqueous solution of the anionic compound, and the dispersion liquids in the dispersion step have a pH of 4 or more.

Meanwhile, it was confirmed that the comparative examples 1 to 4 in which the aqueous biodegradable-resin dispersions contain anionic compounds, exhibiting a pH smaller than 7 in 1 wt. % aqueous solution of the anionic compound, and the dispersion liquids in the dispersion step have a pH smaller than 4 showed insufficient stability and heat sealability. Further, as shown in Table 3, craft papers applied with aqueous biodegradable-resin dispersions having sodium polyacrylate exhibited an improved water resistance amongst the aqueous biodegradable-resin dispersions that contain anionic compounds exhibiting a pH of 7 or more in 1 wt. % aqueous solution of the anionic compound.

The invention claimed is:

1. An aqueous biodegradable-resin dispersion comprising: a biodegradable resin and an anionic compound, wherein the anionic compound exhibits a pH of 7 or greater in a 1 wt. % aqueous solution of the anionic compound, and wherein the anionic compound is at least one selected from a sodium tetradecene sulfonate; sodium polyphosphate; carboxymethylcellulose sodium; and sodium polyacrylate.

2. The aqueous biodegradable-resin dispersion according to claim 1, wherein the anionic compound is sodium polyacrylate having a weight-average molecular weight of 10,000 to 20,000,000.

3. The aqueous biodegradable-resin dispersion according to claim 1, wherein the biodegradable resin is of polylactate.

4. A food packaging paper obtained using the aqueous biodegradable-resin dispersion according to claim 1.

5. A method for producing an aqueous biodegradable-resin dispersion containing a biodegradable resin and an anionic compound, the method comprising a dispersing step of dispersing, into a solvent, at least the biodegradable resin and the anionic compound that are dissolved therein to obtain a dispersion liquid, wherein the anionic compound exhibits a pH of 7 or greater in a 1 wt. % aqueous solution of the anionic compound, the anionic compound is at least one selected from a sodium tetradecene sulfonate; sodium polyphosphate; carboxymethylcellulose sodium; and sodium polyacrylate, and wherein the dispersion liquid of the dispersing step has a pH of 4 to 9.

6. The aqueous biodegradable-resin dispersion according to claim 1, wherein the content of the anionic compound is 0.01 to 0.8% by weight per the content of the biodegradable resin.

7. The aqueous biodegradable-resin dispersion according to claim 6, wherein the anionic compound is carboxymethylcellulose sodium.

8. The aqueous biodegradable-resin dispersion according to claim 7, the aqueous biodegradable-resin dispersion further comprising a polyvinyl alcohol, wherein the mass ratio (A/B) as a ratio of (A) the anionic compound to (B) the polyvinyl alcohol is in a range of 1/5 to 1/99.

9. The aqueous biodegradable-resin dispersion according to claim 6, wherein the anionic compound is sodium tetradecene sulfonate.

10. The aqueous biodegradable-resin dispersion according to claim 9, the aqueous biodegradable-resin dispersion further comprising a polyvinyl alcohol, wherein the mass ratio (A/B) as a ratio of (A) the anionic compound to (B) the polyvinyl alcohol is in a range of 1/5 to 1/99.

11. The aqueous biodegradable-resin dispersion according to claim 6, wherein the anionic compound is sodium polyphosphate.

12. The aqueous biodegradable-resin dispersion according to claim 11, the aqueous biodegradable-resin dispersion further comprising a polyvinyl alcohol, wherein the mass ratio (A/B) as a ratio of (A) the anionic compound to (B) the polyvinyl alcohol is in a range of 1/5 to 1/99.

* * * * *